March 2, 1926. 1,575,122
C. P. MADSEN
MOLD, DIE, AND THE LIKE, AND METHOD OF MAKING THE SAME
Original Filed June 25, 1919  2 Sheets-Sheet 1

Charles P. Madsen Inventor
By his Attorneys

March 2, 1926. 1,575,122
C. P. MADSEN
MOLD, DIE, AND THE LIKE, AND METHOD OF MAKING THE SAME
Original Filed June 25, 1919  2 Sheets-Sheet 2

Charles P. Madsen Inventor
By his Attorneys
Emery, Varney, Blair & Myers

Patented Mar. 2, 1926.                BEST AVAILABLE COPY        1,575,122

UNITED STATES PATENT OFFICE.

CHARLES P. MADSEN, OF NEW YORK, N. Y., ASSIGNOR TO MADSENELL CORPORATION, OF NEW YORK, N. Y., A CORPORATION OF NEW YORK.

MOLD, DIE, AND THE LIKE AND METHOD OF MAKING THE SAME.

Application filed June 25, 1919, Serial No. 306,597. Renewed May 7, 1925.

*To all whom it may concern:*

Be it known that I, CHARLES P. MADSEN, a citizen of the United States, and a resident of the city, county, and State of New York, have invented an Improvement in Molds, Dies, and the like and Methods of Making the Same, of which the following is a specification.

My invention aims to provide forms, molds, dies and the like of a new and superior type especially for forming or shaping materials which in their natural state are more or less plastic or which may be rendered plastic by such agents as solvents or heat. Such materials, for instance, may comprise glass, porcelain, electrical insulating materials, metals, rubber and celluloid. This invention also aims to provide a new, simple and economical means of producing such forms, molds or dies.

In the accompanying drawings I have diagrammatically illustrated several illustrative embodiments of my invention in which drawings.

Figure 1:
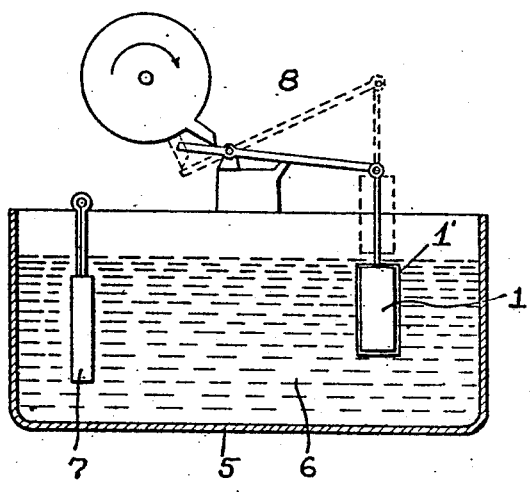
Figure 1 is a longitudinal cross section of an electro-deposition apparatus diagrammatically illustrating the manner of producing the various molds here shown and described for purposes of illustration and shown more particularly as used in connection with one illustrative embodiment of mold.
Figure 3:
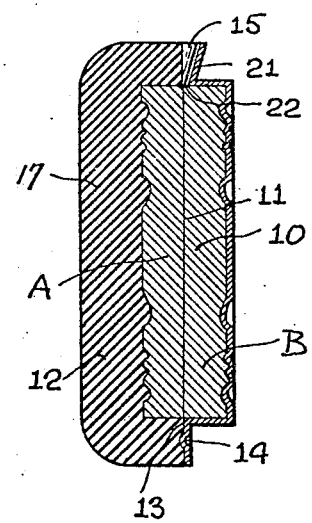
Figures 3 and 4 are cross-sectional and perspective views, respectively, of another form of mold during one stage of its production.

The materials customarily available for making molds and the like are poorly adapted for the purpose, especially where chemical reactions taking place at high temperatures are employed during the process of molding, and the cost of making molds from the usual materials is so high as to very much limit their use. This is especially true in molds for die casting and glass working. Molds made of ceramic materials, which have been employed to some extent in forming glass articles, are too frail, and cast metal molds lack accuracy and are short-lived. The most satisfactory molds from an operating standpoint are therefore those cut from steel or alloys by tool-working means, as in this way a high degree of accuracy is obtained. But even these molds are short-lived because they soon lose their accuracy by destructive oxidation or other chemical action, and their cost is prohibitive for many purposes.

I have discovered that the "nickel metals", by which I mean nickel, or cobalt, or alloys containing either nickel or cobalt or both of these metals, but more particularly substantially pure nickel, possess superior and highly desirable properties for the desired purpose. Nickel, for example, is not only refractory, but I have discovered that it possesses a very valuable oxidation characteristic. Its surface oxidation is constructive for the desired purpose, rather than destructive. The oxide coating which forms on nickel when subjected to high temperatures in air, for example, possesses the mechanical properties of a metal, is very hard and firmly adherent. It furthermore forms with a glossy surface, even though the original surface of the nickel is not polished, and is so thin and uniform in thickness that it does not appreciably change the dimensions of even very small lines or markings. After this oxide film has formed, it arrests any further and deeper oxidation, and also resists to a remarkably high degree other chemical action. It furthermore possesses the valuable property of very effectively preventing alloying of other metals with the nickel when brought in contact with it in a molten state, and also prevents the adherence of molten or hot glass and other materials.

I have therefore conceived the idea of providing molds made, for example, of nickel or of a nickel alloy, with an oxide coating before using the same, and I find that a much more durable and highly useful mold is made in this way. This coating may be obtained chemically, as for instance, by treatment with a hypochlorite. This or other oxidizing means may be used also to enable the deposited metal to receive an adherent coating of oxide. A much heavier coating, however, is obtained by maintaining the article at a temperature of about 850° C. for twelve to forty-eight hours in the air, it being understood, of course, that such gases as carbon dioxide and carbon monoxide should be excluded.

Pure nickel is, however, not readily obtainable in malleable or workable condition in blocks or slabs large enough for making molds by tool-working means, and is even more difficult and expensive to work by cutting than is tool steel. The use of molds cut from solid blocks of nickel is therefore limited to the forming of materials which, either because they can not be handled in any other kind of a mold or for other reason, will bear the additional cost of the cut nickel mold.

I have therefore conceived the idea of fabricating nickel or nickel alloy molds, for example, by means of an electro-deposition process analogous to that disclosed in my copending applications Serial No. 254,793, filed September 19, 1918, Serial No. 297,793, filed May 26, 1919, and Serial No. 297,794, filed May 26, 1919, and I find that the articles produced by this process are usefully different from and far superior for the purpose to those obtained from nickel made by tool-cutting means, as well as being cheaper, and that new and unexpected results are obtained by the use of the electrodeposited material. It is chemically more inert and has a higher melting point. Furthermore, the oxide film which may be formed upon it is better for the desired purpose. It is thinner, more flexible, and finer in texture. It is of different color than that formed on nickel made by the ordinary metallurgical or heat treatment methods. The latter is violet to dark indigo, while the electrolytic nickel metal forms an oxide yellow to brown in color. Molds made of electrolytic nickel by my process, therefore, last longer than even those cut from solid nickel blocks, and possess other unexpected and important advantages set forth below.

Electrodeposition is an ideal method of making a mold of intricate configuration or containing fine lines, but heretofore, as far as I am aware, no process has been known for electrodepositing metals having the necessary properties for the purpose. Moreover, of the refractory metals, only nickel and cobalt can, to my knowledge, be electrodeposited at all, and the ordinary deposits of these metals are porous and pitted, and such deposits are, in addition, so brittle and develop such strains during electrodeposition that they can be deposited only in extremely thin layers which are not of a truly metal character.

The nickel or "nickel metal" made by my process, is therefore, not only usefully different for the purpose from that made by heat treatment means, but it is also different from that made by old electrolytic means in that it combines a degree of malleability not possessed by electrolytically deposited nickel as hitherto made with new characteristics named above and highly useful for the desired purpose.

In preparing the molds comprising the herein described illustrative embodiments of my invention, I may use an electrodeposition bath of the following composition: nickel sulphate, 240 g.; nickel chloride, 20 g.; boric acid, 40 g.; water, 1 liter.

This bath is preferably operated at a temperature of about 130° F. Except for the addition of boric acid, as set forth above, the bath should be neutral. The anode may consist of cast or rolled nickel, and the cathode of the form or pattern of which the deposit is to be made.

During deposition the cathode on which the nickel is being electrodeposited, is intermittently or periodically exposed to a gaseous medium, such as the air, as by removal from the bath or otherwise. The time during which the cathode and the electrodeposited nickel carried by it are kept out of the bath should be more than what I term the "minimum" or "hydrogen dissipation" period, which is necessary to permit the hydrogen deposited with the metal to be dissipated or removed by contact with the surrounding gaseous medium, such as the air. This "minimum" or "hydrogen dissipation" period may be readily determined by trial and experiment and is generally greater than about one second, usually two seconds.

The time during which the cathode and the deposit carried by it are kept out of the bath should not, however, exceed what I term the "maximum" or "critical" or "separable deposit" period, which, in the case here given, is from about 6 to 16 seconds, by which I mean that if the time during which the cathode and its deposit are kept out of the bath exceeds the said "maximum" or "critical" or "separable deposit" period, on restoring the cathode and its deposit to the bath, the succeeding deposit will not be adherent but will separate or be easily separable from the previous deposit. This results in a laminated, weak metal, a condition which is obviously to be avoided, where a sound unitary metal is desired.

The frequency of removal or "exposure frequency period" is determined by the factors of deposition which influence hydrogen liberation, such as the degree of exactness of neutrality, current density, and temperature. I have found that in the bath here described by way of example, and operating at a temperature of about 130° F., and with a current density of about 10 amperes per square decimeter, this period may be from 1 to 2 minutes.

In order, moreover, that the electrodeposited metal, such as the nickel in the example given, may not only be dense, reguline and free from pores and hydrogen, but in order also that said metal shall be free from what are known as "pits" in the art of the deposition of the "nickel metals", I add to the bath, preferably before starting the electro-deposition, a quantity of finely divided nickel hydrate, preferably freshly precipitated nickel hydrate ($NiO_2H_2$) and probably existing in a colloidal condition, which nickel hydrate remains in suspension in the bath during electrodeposition. While the quantity of hydrate so added may vary within considerable limits, I prefer to add from 1 to 5 grams, generally 1 gram, of said colloidal nickel hydrate to each liter of bath solution.

I have discovered that by adding to the bath certain salts, such as the sulphates, of the alkali metals, preferably sodium, finely divided or colloidal nickel hydrate is produced and held in suspension in the bath. This freshly and continuously produced hydrate replenishes the hydrate which during the operation of the bath aggregates or for other reasons goes out of suspension and drops to the bottom of the bath. Such salts have further beneficial effects and greatly improve the operation of the bath and the character of the deposits formed. For this purpose I may add varying amounts, such as from about 1 to about 10 grams, preferably 1 gram, of sodium sulphate for each liter of bath solution.

The action of the colloid-producing substance, such as the sodium sulphate, described above, is to produce by and during electrodeposition, some caustic soda or sodium hydroxide. The caustic soda or sodium hydroxide thus produced, by interaction with the nickel salts present in the bath, such as the nickel sulphate, generates finely divided or colloidal nickel hydrate which remains suspended in the bath. The interaction at the same time re-generates the sodium sulphate. The sodium sulphate or its equivalent also acts to assist the deposition and to improve the character of the deposit, which factors are also further assisted by the initial addition of nickel hydrate in finely divided or colloidal condition to the bath.

In Figure 1 is shown, diagrammatically, the vat 5 in which the bath 6 is contained. The anode is indicated at 7, the form or pattern at 1, and the deposit at 1'. Any suitable means, diagrammatically indicated at 8, may be employed for intermittently or periodically removing the form or pattern, carrying the deposit, from the bath.

The nickel which results from the electrodeposition process set forth above and which is one of the "nickel metals" of which the molds described herein may be made, is dense, reguline, homogeneous, malleable and ductile. The new nickel herein described is substantially free from pores and pits and contains no appreciable amount of hydrogen.

The nickel herein described differs in character from the nickel obtained by the usual metallurgical processes in that my new nickel is free from the usual "poisonous" contents such as sulphur, silicon, arsenic, carbon, carbides, oxygen, and other gases, and oxide containing compounds, generally present in metallurgical nickel and rendering the same imperfect and more difficult to work.

Furthermore, my new nickel is to be further differentiated from the ordinary metallurgical nickel in that it has a finer and more even grain than such metallurgical nickel, as is shown by metallographic microphotographs. It is also considerably purer than such metallurgical nickel, resists chemical action better and has a higher melting point.

It is, of course, to be understood that where a deposit of cobalt, having the foregoing desirable properties, is desired to be produced, a cobalt anode is used in place of the corresponding nickel compounds. Where alloys of either nickel or of cobalt or of both of these metals are desired to be produced, means analogous to the means herein set forth for the deposition of nickel and of cobalt in the desired condition and having the desired properties may be employed.

Among the herein described illustrative embodiments of my invention may be mentioned, a mold having merely a coating of nickel or of a "nickel metal" for its forming surface, and also a mold made entirely by deposition. In the case of very large molds, where great accuracy is not required, it may be desirable to make a mold of another metal, such as iron or bronze, and then give it a dense, malleable coating of nickel by my deposition process, which coating may subsequently be oxidized when the purpose for which the mold is required makes this desirable. Such a mold may be readily cut, chased or hammered to obtain the necessary detail, which cannot be done in the case of nickel deposited by the prior methods.

I prefer to make most molds directly by deposition, however. This embodiment may be carried out by depositing nickel or the "nickel metal" by my process upon a properly prepared replica of the object. This may be the original object, a wood or a plaster of Paris pattern, or a plaster of Paris or a metal cast. If the pattern is of non-conductive material, it is first rendered conductive by any suitable means, such as bronze powder, and if of metal is treated to receive a nonadherent deposit, as by oxidizing the same.

For example, three different types of molds among others, may be made by this process. One form is suitable for producing relatively flat objects in which an accurate configuration is required on one side only. Such molds may be used to form ceramic tiles or mosaics, and various kinds of metal filigrees. These molds may be made without a rim, but are preferably provided with a rim to a height representing the thickness of the desired cast. They may then either be mounted so that the edges of the rim will be level and the effect of gravity depended upon for causing the back of the object to become level if cast in a fluid condition, or they may be used as inserts in a sand or other mold in which case the back of the casting can be shaped by the sand mold.

In making small metal filigree castings, such as are used on ornamental silverware, and on cash registers, etc., the molds may not be backed by sand or other investment, but are preferably so mounted that they may be heated to a high temperature. In this manner the thin portions of the cast will flow readily and castings can be made much thinner than would otherwise be possible.

Figure 2:
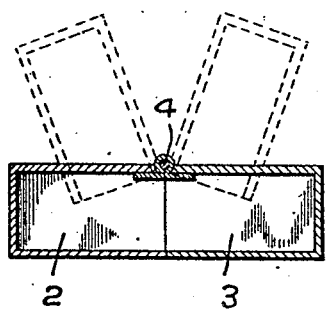
Figure 2 is a longitudinal section of the mold diagrammatically shown during the process of production in Figure 1.
Figure 4:
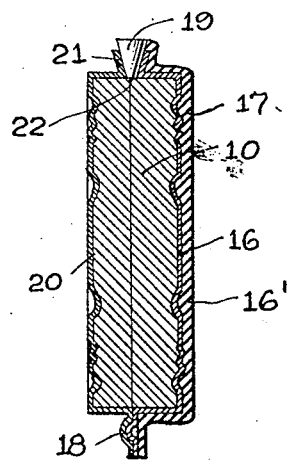
Figure 5:
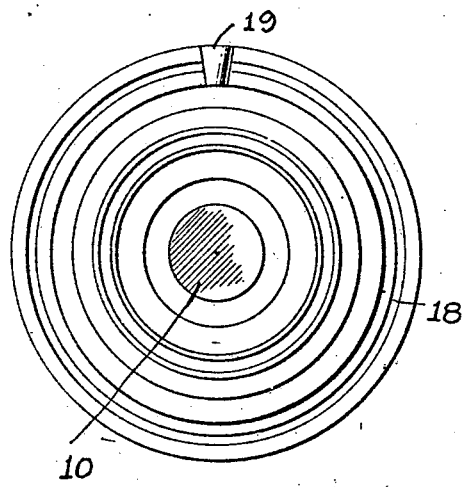
Figure 5 is a cross section of such mold during another stage of its production.

An illustrative embodiment of my invention is shown in Figures 1 and 2 of the drawing, the mold shown therein being intended for forming materials which do not shrink appreciably during formation, but which must be formed on all surfaces. Such materials, for instance, include certain metal alloys, glass, celluloid and rubber. I may make this type of mold especially if for large objects, by depositing the nickel or "nickel metal" over substantially the entire surface of the article, replica or pattern 1, and then sawing the whole into two or more parts, as 2 and 3. The parts may then be hinged together, as at 4, or otherwise made to register. Molds of this type for smaller articles or in cases where the width of the saw cut would seriously alter the dimensions may be made so as to compensate for the width of the saw cut by making the pattern large enough as by first cutting it in two and inserting a piece equal to the combined width of two cuts.

I prefer in most cases, however, to produce molds of this type, when required to be in two or more parts in the manner diagrammatically illustrated in Figures 3, 4, 5 and 6. To do this, the object or pattern 10 is first marked, as at 11, to indicate the lines of separation of the several parts in which the mold is to be made in order to enable the cast formed in the mold to be removed. Part of its surface, as the portion A, may then be embedded in plaster of Paris or wax 12 to a considerable thickness, which plaster of Paris or wax is formed so that it provides a border 13 of appreciable width substantially at right angles to the surface of the object. This border may be left plain, but preferably has ridges or indentations such as the channel 14.

If a pouring opening or one for inserting material into the mold when assembled is desired, this can be made by placing either a half cylinder or a half truncated cone 15 on the desired portion of the wax border. The border is now metalized to receive a deposit for a predetermined distance beyond the groove 14, which deposit will be integral with that made on the exposed portion of the surface of the object or pattern 10. This pattern is, of course, if non-metallic, treated to receive a deposit, and if metallic, it is treated to receive a non-adherent deposit.

The form or pattern 10 is then manipulated in the electrodeposition process as set forth above in connection with the form or pattern 1 shown in Figures 1 and 2.

When the deposit has been formed to the desired thickness, the whole is removed from the bath and the plaster or wax embedding material is then removed.

The outer exposed surface 16 of the mold portion 16 is now "stopped off" or covered by means of an insulating material such as celluloid, as indicated at 17, to prevent the same from receiving any further deposit. The rigid flange 18 is now treated to receive a non-adherent deposit, as by being oxidized, for example. The form 10, with the portion A now exposed and the portion B covered with the mold portion 16, is now returned to the bath to receive a deposit of the character already described on the portion A. This deposit will have a recessed or channelled flange portion 19 and a main portion 20. In the depression 21 made by the half truncated cone 15 in the first deposit an entire truncated cone of the same diameter is inserted previous to making the second deposit, and in this way the entrance hole 22 for the material to be formed is provided.

Obviously an analogous mode of procedure may be adopted where the mold is to consist of more than two, such as three, four or more parts.

It is obvious that the various deposited parts of a mold made in this manner will not only register, but will reproduce the dimensions and markings of the original object with a high degree of accuracy.

Such deposits may be made heavy enough to withstand the pressures needed for most purposes, but where very high pressures are to be used, they can be backed up by casting other metal, as bronze, around them, or by hard soldering them into a pressed steel form or cast iron block. In other cases, however, their thinness is an advantage, and in molding materials which must be formed very hot and allowed to cool before removal, as in the case of casting metals, a new result may be obtained. Since these molds may be heated and cooled quickly, they may be heated to a temperature close to the melting point of the metal and then allowed to cool with the cast. In this manner metals having a considerable temperature coefficient of expansion may be cast which now are difficult to cast in steel molds because it is impractical to heat such molds sufficiently.

This type of mold is also advantageous without any backing for making what are known as "slush castings." This kind of casting consists in pouring molten metal into a mold and swishing it around until a shell of the desired thickness has solidified and then pouring the balance out. Molds made of "nickel metal" by my process are desirable for this purpose because they will cool off faster than a solid block; but their chief advantage is that because of their relatively uniform thickness the heat radiation will be practically uniform and the metal cast will solidify to a uniform thickness in all portions.

Such molds, especially when used for metal casting and glass forming, may to advantage be previously coated with an oxide film. Molds so coated are very durable for forming both metals and glass, and I find that many alloys can be cast in them which can be made in metal molds only with great difficulty, as brass and aluminum.

Figure 7:
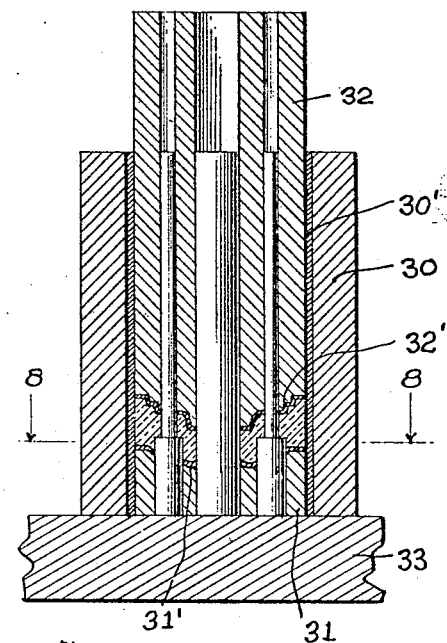
Figures 7 and 8 are longitudinal and cross sections of another form of mold.
Figure 6:
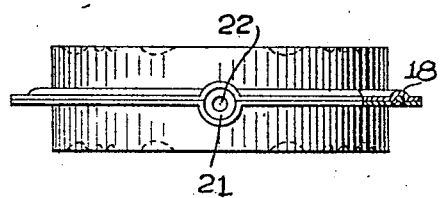
Figure 6 is a top elevation of such mold when completed and assembled.
Figure 8:
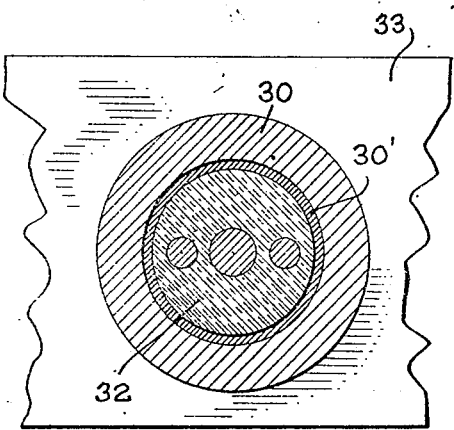

Still another embodiment of my invention is illustrated in Figures 7 and 8. This type of mold is intended for forming materials which shrink considerably during the process of forming them. Examples of such materials are clay, as used for making porcelain goods, and the various electrical insulating compounds, such as gummon, bakelite and condensite. One portion at least of such molds must be capable of moving with relation to the other portion or portions, without letting any material escape, and usually a higher pressure is used than in the case of ordinary casting.

Molds of this type are, therefore, required to be very heavy and are usually made in at least three parts, namely, a tube 30 which is an elongation of the sides of the object, a bottom plate 31 whose top surface contains the configuration of the bottom of the object, and a plunger 32 which moves in the tube and whose bottom surface contains the configuration of the top of the object. In operating such a mold, the tube with its bottom plate facing upwards is placed on the platen 33 of a hydraulic press and the material, usually in a powdered form, inserted. The plunger is then inserted and the whole subjected to pressure. The object is removed by means of a knockout arrangement in the press, of the usual type and not deemed necessary to show here.

In making molds of this type, deposits of nickel metal are made by my process to the desired thickness on the top and bottom faces only of the object or pattern. These are then mounted, either mechanically or by hard solder, on other pieces of metal to make the bottom plate and plunger, as indicated at 31' and 32'.

The side or tubular portion 30' of the mold is deposited on a separate or second form or pattern which is an elongation of the sides of the object which the mold is intended to shape. For most purposes this tubular portion may be deposited heavily enough without reinforcement, although it may be more economical in certain cases to reinforce such tubular portion by steel or other tubing of comparatively thick walls as the tube 30 shown in Figures 7 and 8.

It is, of course, to be understood that my invention is not to be limited to the particular forms thereof here shown and described for purposes of illustration only.

What I claim is:

1. As an article of manufacture, a mold, die or the like comprising a non-porous, malleable, nickel-containing metal provided with a dense, hard, adherent coating of an oxide of nickel.

2. As an article of manufacture, a mold, die or the like comprising non-porous, malleable nickel provided with a dense, hard, adherent coating of an oxide of nickel.

3. As an article of manufacture, a mold, die or the like comprising a non-porous, electrodeposited, malleable, nickle-containing metal provided with a dense, hard, adherent coating of an oxide of nickel.

4. As an article of manufacture, a mold, die or the like comprising non-porous, electrodeposited, malleable nickel provided with a dense, hard, adherent coating of an oxide of nickel.

5. As an article of manufacture, a mold, die or the like comprising a nickel-containing metal provided with a dense, hard, adherent coating of an oxide of nickel.

6. As an article of manufacture, a mold, die or the like comprising nickel provided with a dense, hard, adherent coating of an oxide of nickel.

7. As an article of manufacture, a mold, die or the like comprising a non-porous, malleable, nickel-containing metal provided with an oxidized surface.

8. As an article of manufacture, a mold, die or the like comprising a non-porous, malleable, nickel-containing metal provided with an oxidized surface.

9. As an article of manufacture, a mold, die or the like comprising a nickel-containing metal provided with an oxidized surface.

10. As an article of manufacture, a mold, die or the like comprising nickel provided with an oxidized surface.

In testimony whereof, I have signed my name to this specification this 23rd day of June, 1919.

CHARLES P. MADDEN.